(12) United States Patent
Mendoza (10) Patent No.: US 7,715,213 B2
(45) Date of Patent: May 11, 2010

(54) CABLE MANAGEMENT RACK FOR TELECOMMUNICATION CROSS-CONNECT SYSTEMS

(75) Inventor: Jose-Filonel Tawag Mendoza, Brooklyn Center, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 22 days.

(21) Appl. No.: 12/152,272

(22) Filed: May 13, 2008

(65) Prior Publication Data

US 2008/0285252 A1    Nov. 20, 2008

Related U.S. Application Data

(62) Division of application No. 10/952,570, filed on Sep. 27, 2004, now Pat. No. 7,391,625, which is a division of application No. 10/406,487, filed on Apr. 3, 2003, now Pat. No. 6,796,438, which is a division of application No. 09/316,742, filed on May 21, 1999, now Pat. No. 6,543,626.

(51) Int. Cl.
*H02B 1/20* (2006.01)
(52) U.S. Cl. .......................... 361/826; 174/97
(58) Field of Classification Search ................. 361/826; 174/97
See application file for complete search history.

(56) References Cited

U.S. PATENT DOCUMENTS 2,896,009 A    7/1959    Caveney (Continued)

FOREIGN PATENT DOCUMENTS

DE    93 02 456.8    5/1993

(Continued)

OTHER PUBLICATIONS

"Digital Distribution Frame Products", Brochure by ADC Telecommunications, Inc. of Minneapolis, Minnesota, pp. 1-15 (Mar. 1992).

(Continued)

*Primary Examiner*—Jinhee J Lee
*Assistant Examiner*—Andargie M Aychillhum
(74) *Attorney, Agent, or Firm*—Merchant & Gould P.C.

(57) ABSTRACT

The present disclosure relates to a rack for telecommunications equipment. The rack includes a frame defining a bay opening sized and shaped for receiving a plurality of jack modules. The rack also includes a first set of cable management brackets that define a first vertical channel arranged and configured for receiving and vertically managing a plurality of cross-connect cables. Each of the cable management brackets includes a pivot portion that is pivotally movable relative to the frame. The pivot portions are pivotally movable between first positions in which the pivot portions extend partially across a front of the bay opening, and second positions in which the pivot portions are generally offset from the front of the bay opening. The present disclosure also relates to a rack for telecommunications equipment that includes rear cable management structure that defines a plurality of vertical channels along a back side of the rack. The present disclosure further relates to a telecommunications jack module including an array of jacks arranged in top and bottom horizontal rows. The jack module also includes an array of cross-connect locations positioned beneath the bottom horizontal row of jacks. The array of cross-connect locations is electrically connected to both the top and bottom rows of jacks.

9 Claims, 11 Drawing Sheets

U.S. PATENT DOCUMENTS

| | | | |
|---|---|---|---|
| 4,665,546 A | 5/1987 | Brey et al. | |
| 4,718,858 A | 1/1988 | Godfrey et al. | |
| 5,023,404 A * | 6/1991 | Hudson et al. | 174/97 |
| 5,220,600 A | 6/1993 | Chouanard et al. | |
| 5,326,934 A | 7/1994 | LeMaster et al. | |
| RE34,955 E | 5/1995 | Anton et al. | |
| 5,483,467 A | 1/1996 | Krupka et al. | |
| 5,497,444 A | 3/1996 | Wheeler | |
| 5,586,012 A | 12/1996 | Lerman | |
| 5,645,434 A | 7/1997 | Leung | |
| 5,683,001 A | 11/1997 | Masuda et al. | |
| 5,685,741 A | 11/1997 | Dewey et al. | |
| 5,758,003 A | 5/1998 | Wheeler et al. | |
| 5,765,698 A | 6/1998 | Bullivant | |
| 5,788,087 A | 8/1998 | Orlando | |
| 5,794,794 A | 8/1998 | Hull | |
| 5,819,956 A | 10/1998 | Rinderer | |
| 5,867,372 A | 2/1999 | Shie | |
| 5,898,129 A | 4/1999 | Ott et al. | |
| 5,921,402 A * | 7/1999 | Magenheimer | 211/26 |
| 5,934,985 A | 8/1999 | Aarris et al. | |
| 6,102,214 A | 8/2000 | Mendoza | |
| 6,118,075 A * | 9/2000 | Baker et al. | 174/72 A |
| 6,223,909 B1 | 5/2001 | Mendoza | |
| 6,234,836 B1 | 5/2001 | Schmidt et al. | |
| 6,357,603 B1 | 3/2002 | Dingman | |
| 6,543,626 B1 | 4/2003 | Mendoza | |
| 6,629,675 B1 | 10/2003 | Bjorklund et al. | |
| 6,759,307 B1 | 7/2004 | Yang | |
| 6,796,438 B2 | 9/2004 | Mendoza | |
| 7,391,625 B2 | 6/2008 | Mendoza | |

FOREIGN PATENT DOCUMENTS

| | | |
|---|---|---|
| DE | 295 15 984 U1 | 12/1996 |
| GB | 2 316 859 A | 3/1998 |
| WO | WO 94/08429 | 4/1994 |
| WO | WO 96/38884 | 12/1996 |
| WO | WO 98/35175 | 8/1998 |

OTHER PUBLICATIONS

"Digital Signal Cross-Connect (DSX-3) Front and Rear Cross-Connect Products", Brochure by ADC Telecommunications, Inc. of Minneapolis, Minnesota, pp. 1-71 (Feb. 1999).

"DSX-1 Digital Signal Cross-Connect, Modules, Panels and Accessories. Sixth Edition", Brochure by ADC Telecommunications, Inc. of Minneapolis, Minnesota, pp. 1-81 (May 1998).

"DSX-1 Digital Signal Cross-Connect Rack Framework and Accessories. Sixth Edition", Brochure by ADC Telecommunications, Inc. of Minneapolis, Minnesota, pp. 1-34 (Jul. 1998).

"Fiber Cable Management Products. Second Edition", Brochure by ADC Telecommunications, Inc. of Minneapolis, Minnesota, pp. 1-144 (Oct. 1995).

"FL2000 Products", Brochure by ADC Telecommunications, Inc. of Minneapolis, Minnesota, pp. 1-48 (Nov. 1996).

"Mini DSX-3 Products", Brochure by ADC Telecommunications, Inc. of Minneapolis, Minnesota, pp. 1-35 (Jun. 1997).

"Next Generation Frame (NGF) Product Family Ordering Guide", Brochure by ADC Telecommunications, Inc. of Minneapolis, Minnesota, pp. 1-21 (Oct. 1998).

* cited by examiner

CABLE MANAGEMENT RACK FOR TELECOMMUNICATION CROSS-CONNECT SYSTEMS

CROSS REFERENCE TO RELATED APPLICATIONS

This application is a divisional of U.S. patent application Ser. No. 10/952,570, filed on Sep. 27, 2004 now U.S. Pat. No. 7,391,625; which is a divisional of U.S. patent application Ser. No. 10/406,487, filed on Apr. 3, 2003, now U.S. Pat. No. 6,796,438; which is a divisional of 09/316,742, filed May 21, 1999, now U.S. Pat. No. 6,543,626; which applications are incorporated herein by reference.

FIELD OF THE INVENTION

The present invention relates generally to the field of telecommunication equipment. More particularly, the present invention relates to high density frames, bays or racks for holding jack modules used to provide cross-connections between telecommunication circuits.

BACKGROUND OF THE INVENTION

A digital cross-connect system (DSX) provides a location for interconnecting two digital transmission paths. The apparatus for a DSX is located in one or more frames, racks or bays, usually in a telephone central office. The DSX apparatus also provides jack access to the transmissions paths. DSX jacks are well known and commonly include a plurality of bores or ports sized for receiving tip-and-ring plugs. In the case of tip-and-ring plugs, a plurality of spring contacts are provided within the ports for contacting the tip-and-ring plugs. The jacks are typically electrically connected to digital transmission lines, and are also electrically connected to a plurality of wire termination members used to cross-connect the jacks. By inserting plugs within the ports of the jacks, signals transmitted through the jacks can be interrupted or monitored.

The number of jacks or cross-connect points that are located at a bay of a given size is referred to as the density of the bay. As the cross-connect density increases, the management of telecommunication wires or cables in the bay becomes increasingly complex. For high density DSX bays, wire management is critical. Ease of access to individual jacks or jack modules is also important.

SUMMARY OF THE INVENTION

One aspect of the present invention relates to a rack for telecommunications equipment. The rack includes a frame defining a bay opening sized and shaped for receiving a plurality of jack modules. The rack also includes a first set of cable management brackets that define a first vertical channel arranged and configured for receiving and vertically managing a plurality of cross-connect cables. Each of the cable management brackets includes a pivot portion that is pivotally movable relative to the frame. The pivot portions are pivotally movable between first positions in which the pivot portions extend partially across a front of the bay opening, and second positions in which the pivot portions are generally offset from the front of the bay opening. To insert a jack module into the bay opening or to remove a jack module from the bay opening, the pivot portions are pivoted to the second positions thereby allowing the jack module to be moved in or out of the bay opening without encountering interference from the cable management brackets. In this manner, jack modules can be inserted into the bay opening or removed from the bay opening without requiring the cable management brackets to be disconnected from the frame.

Another aspect of the present invention relates to a cable management bracket. The cable management bracket includes a first bracket portion having a main base and spaced-apart, substantially parallel upper and lower bracket members that extend transversely outward from the main base. The first bracket portion also includes retaining tabs that project transversely outward from free ends of the upper and lower bracket members. The cable management bracket also includes a second bracket portion including a pivot base and an intermediate bracket member that extends transversely outward from the pivot base. The intermediate bracket member is vertically aligned generally between the upper and lower bracket members of the first bracket portion. The second bracket portion also includes a retaining tab that projects transversely outward from the intermediate bracket member. The pivot base of the second bracket portion is pivotally connected to the main base of the first bracket portion such that the first and second bracket portions are pivotally movable relative to one another. For example, the first and second bracket portions can be pivoted between a first position in which the first and second bracket portions define a generally rectangular opening sized for receiving a plurality of cross-connect cables, and a second position in which the intermediate bracket member of the second bracket portion extends between the upper and lower bracket members of the first bracket portion.

A further aspect of the present invention relates to a jack module for a telecommunications system. The jack module includes an array of jacks forming a front face defining a plurality of ports for receiving tip-and-ring plugs. The array of jacks includes a first horizontal row of jacks and a second horizontal row of jacks. The first horizontal row of jacks is positioned above the second horizontal row of jacks. The jack module also includes an array of cross-connect locations positioned beneath the second horizontal row of jacks. The array of cross-connect locations includes first sets of cross-connect locations that are electrically connected to corresponding ones of the first row of jacks. The array of cross-connect locations also includes second sets of cross-connect locations that are electrically connected to corresponding ones of the second row of jacks.

Still another aspect of the present invention relates to a rack for telecommunications equipment. The rack includes a frame defining a bay opening sized and shaped for receiving a plurality of jack modules through a front side of the frame. The rack also includes a rear cable management structure mounted at a back side of the frame. The rear cable management structure includes a rear panel defining at least one access opening sized and positioned for providing access to input/output connection locations corresponding to at least one of the jack modules when the jack module is mounted in the bay opening of the frame. The rear cable management structure also includes rear channel defining members secured to the rear panel. The rear channel defining members define a plurality of rear cable management channels sized and shaped for providing vertical cable management for input/output cables that extend along the back side of the frame. By running input/output cables along the back side of the frame, fillers between adjacent frames can be eliminated. Also, besides managing the input/output cables located at the back side of the frame, the rear channel defining members can also be used to segregate input/output cables from power and ground wires corresponding to jack modules mounted on the rack.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

I. General Description

Reference will now be made in detail to exemplary aspects of the present invention that are illustrated in the accompanying drawings. Wherever possible, the same reference numbers will be used throughout the drawings to refer to the same or like parts.

Figure 1:
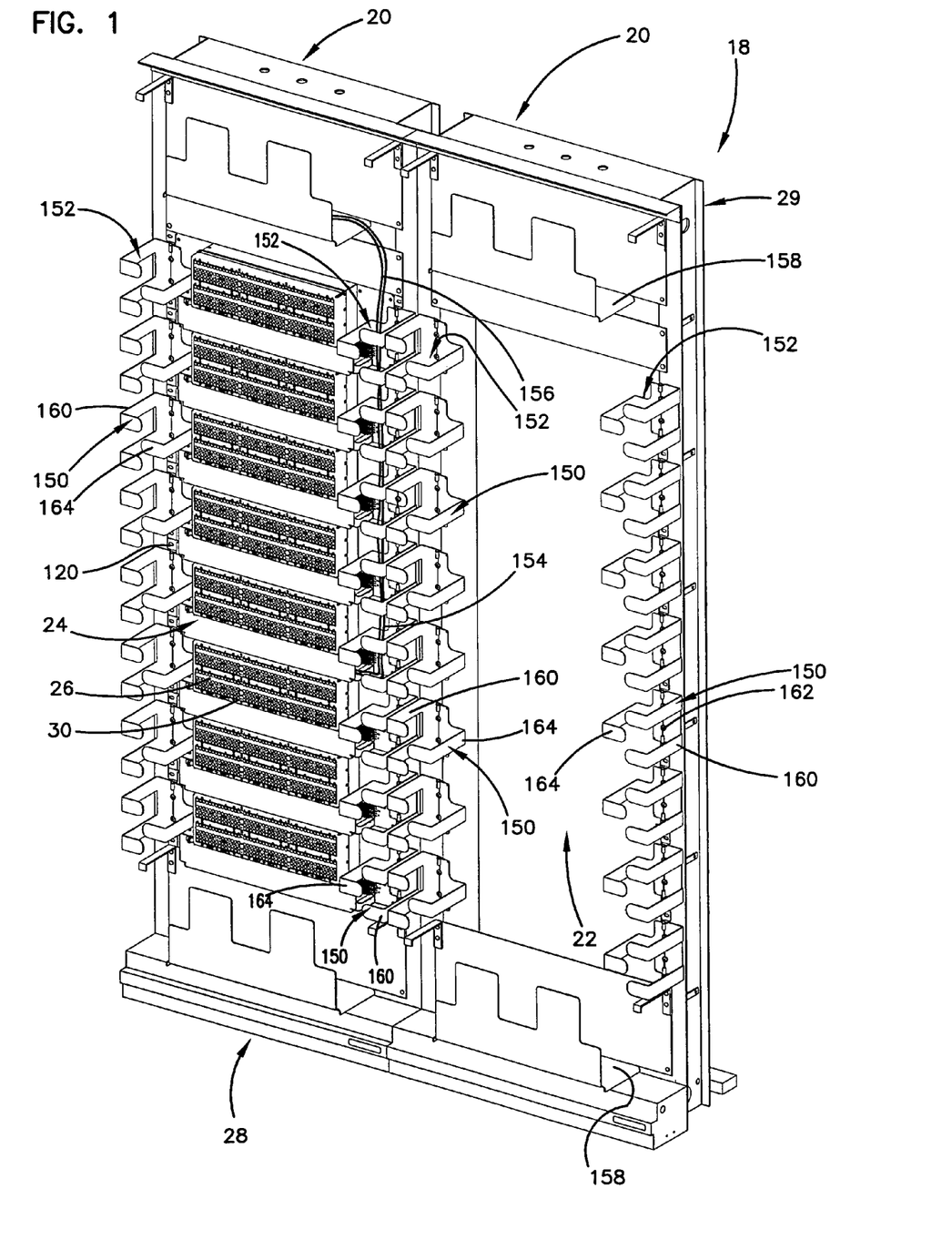
FIG. 1 is perspective view of two interconnected racks constructed in accordance with the principles of the present invention.
Figure 2:
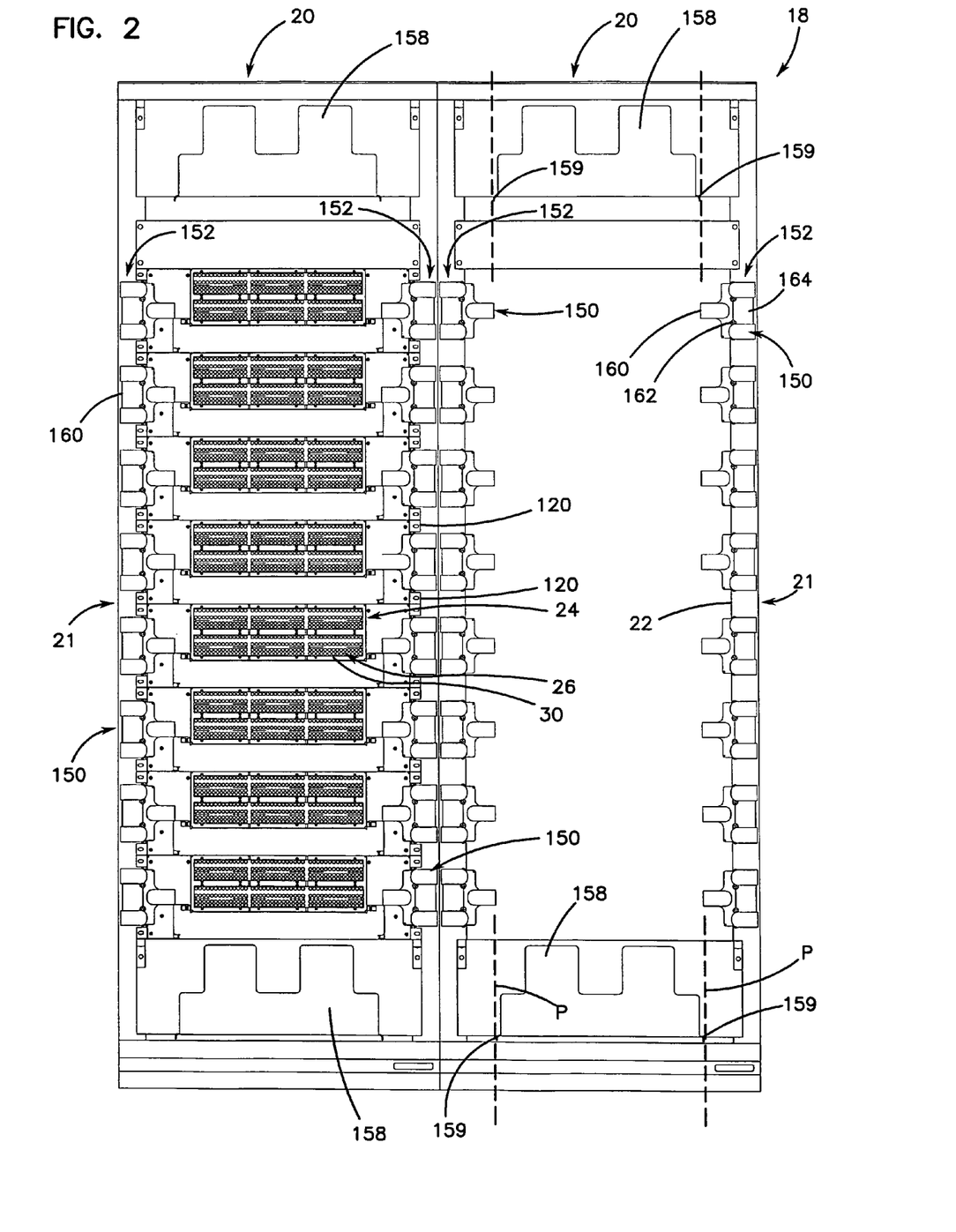
FIG. 2 is a front, elevational view of the two interconnected racks of FIG. 1.

FIGS. 1 and 2 show two interconnected racks 20 constructed in accordance with the principles of the present invention. The racks 20 are configured to form a front cross-connect system 18. Each of the racks 20 includes a frame 21 that defines a generally rectangular bay opening 22 sized and shaped for receiving a plurality of jack modules 24. The jack modules 24 of the system each include a chassis 120 housing a front jack field 26, a front cross-connect field 46 (shown in FIGS. 4 and 5), and a rear equipment or input/output field 58 (shown in FIGS. 6 and 7). For clarity, the left rack 20 is shown fully loaded with the jack modules 24, while the right rack 20 is empty such that the bay opening 22 is more clearly visible.

Figure 3:
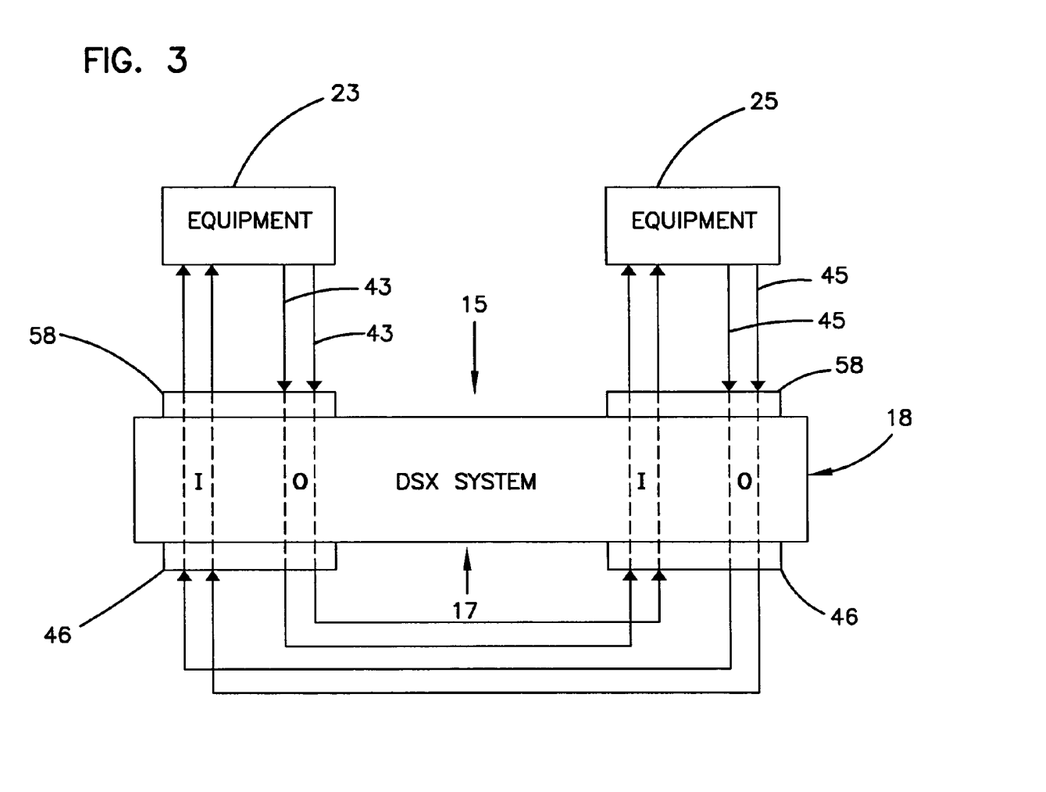
FIG. 3 is a schematic illustration showing the cross-connect system being used to cross-connect two pieces of telecommunications equipment.

The front cross-connect system 18 is used to provide cross-connections between pieces of telecommunications equipment. For example, FIG. 3 schematically shows first and second pieces of telecommunications equipment 23 and 25 that are cross-connected by the front cross-connect system 18. As shown in FIG. 3, a twisted pair signal 43 from the first piece of equipment 23 is inputted at a back side 15 of the system 18, cross-connected across a front side 17 of the system 18, and then outputted from the back side 15 of the system 18 to the second piece of equipment 25. Similarly, a twisted pair signal 45 from the second piece of equipment 25 is inputted at the back side 15 of the system 18, cross-connected across the front side 17 of the system 18, and then outputted from the back side 15 of the system 18 to the first piece of equipment 23. The cross-connect fields 46 provide access locations for cross-connecting the signals 43 and 45. The input/output fields 58 provide access locations for inputting and outputting the signals 43 and 45. As will be described later in the specification, the jack fields 26 (shown in FIGS. 1 and 2) provide access for interrupting, monitoring and bypassing the signals 43 and 45. As will also be described later in the specification, the racks 20 are provided with various vertical and horizontal cable management structures for managing the cables connected to the cross-connect fields 46 and the input/output fields 58.

II. Chassis

The chassis 120 of the jack modules 24 provide two primary functions. First, the chassis 120 are configured to house or support the jack fields 26, the cross-connect fields 46, and the input/output fields 58. The chassis 120 are also configured to independently secure the jack modules 24 to the frames 21.

Figure 4:
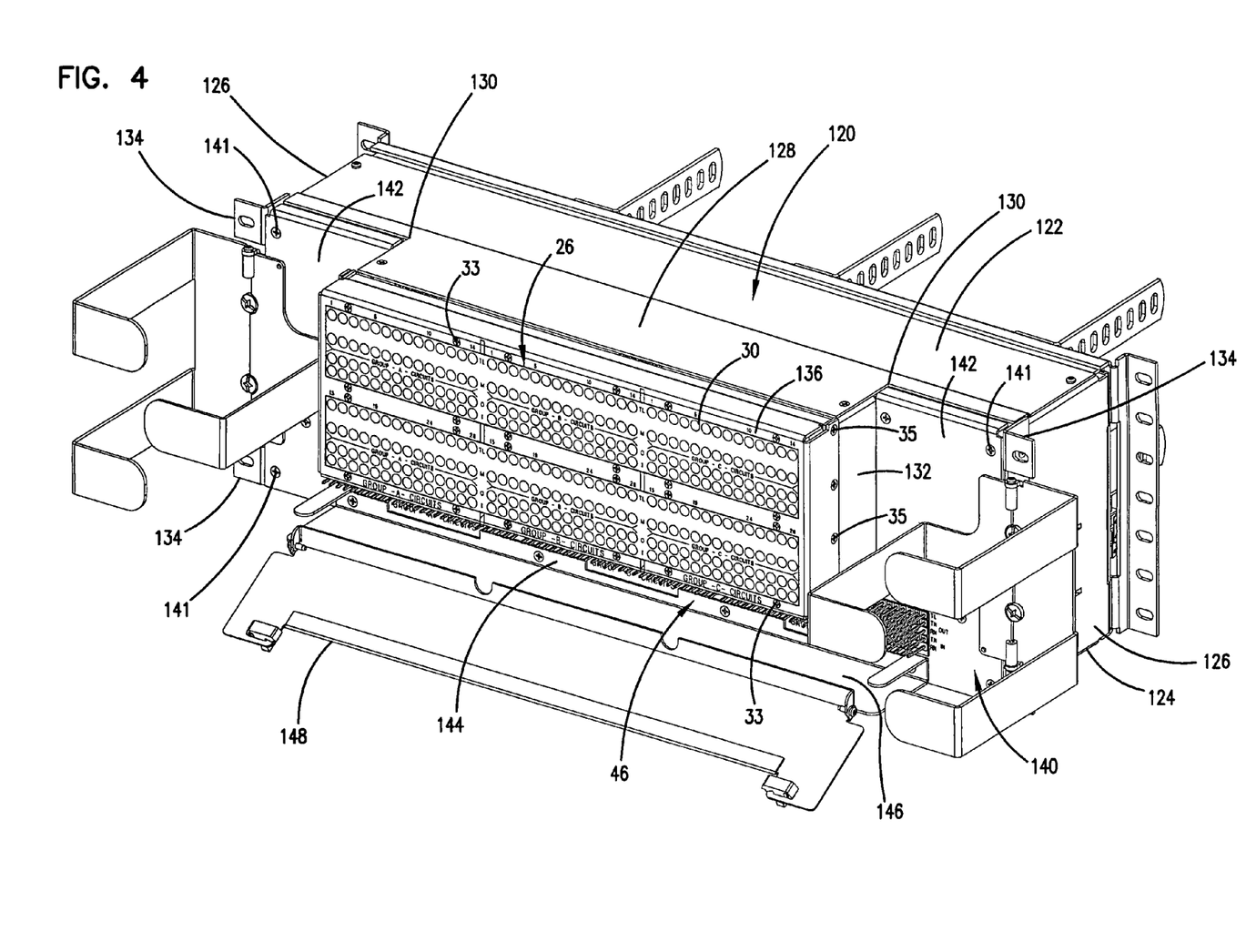
FIG. 4 is a front perspective view of a jack module constructed in accordance with the principles of the present invention.

Referring to FIG. 4, a representative one of the jack modules 24 and its corresponding chassis 120 are shown. The chassis 120 includes a top cover 122 positioned opposite from a bottom cover 124. Oppositely positioned main side walls 126 are fastened between the top and bottom covers 122 and 124. Central extensions 128 (only the top one of which is shown) project outward in a forward direction from the top and bottom covers 122 and 124. Generally rectangular notches 130 are located on opposite sides of the central extensions 128. Oppositely positioned secondary side walls 132 (only one of which is shown) are fastened between central extensions 128. The central extensions 128 and the secondary side walls 132 cooperate to form a housing for receiving one of the jack fields 26.

As indicated above, the chassis 120 are adapted for connection to the frames 21. For example, referring to FIG. 4, the illustrated chassis 120 includes a plurality of mounting flanges 134 positioned at a front side of the jack module 24. The mounting flanges 134 project transversely outward from the main side walls 126 and define apertures for allowing the chassis 120 to be fastened to one of the racks 20 by conventional fasteners (e.g., bolts, screws or the like).

To mount the jack modules 24 within the frames 21, the chassis 120 are inserted into the bay openings 22 through front sides 28 of the frames 21. Once the chassis 120 are positioned within the bay openings 22, the mounting flanges 134 of the chassis 120 are fastened to the frames 21. To remove the jack modules 24 from the frames 28, the mounting flanges 134 are unfastened, and the chassis 120 are pulled back through the front sides 28 of the frames 21.

III. Jack Field

Figure 5:
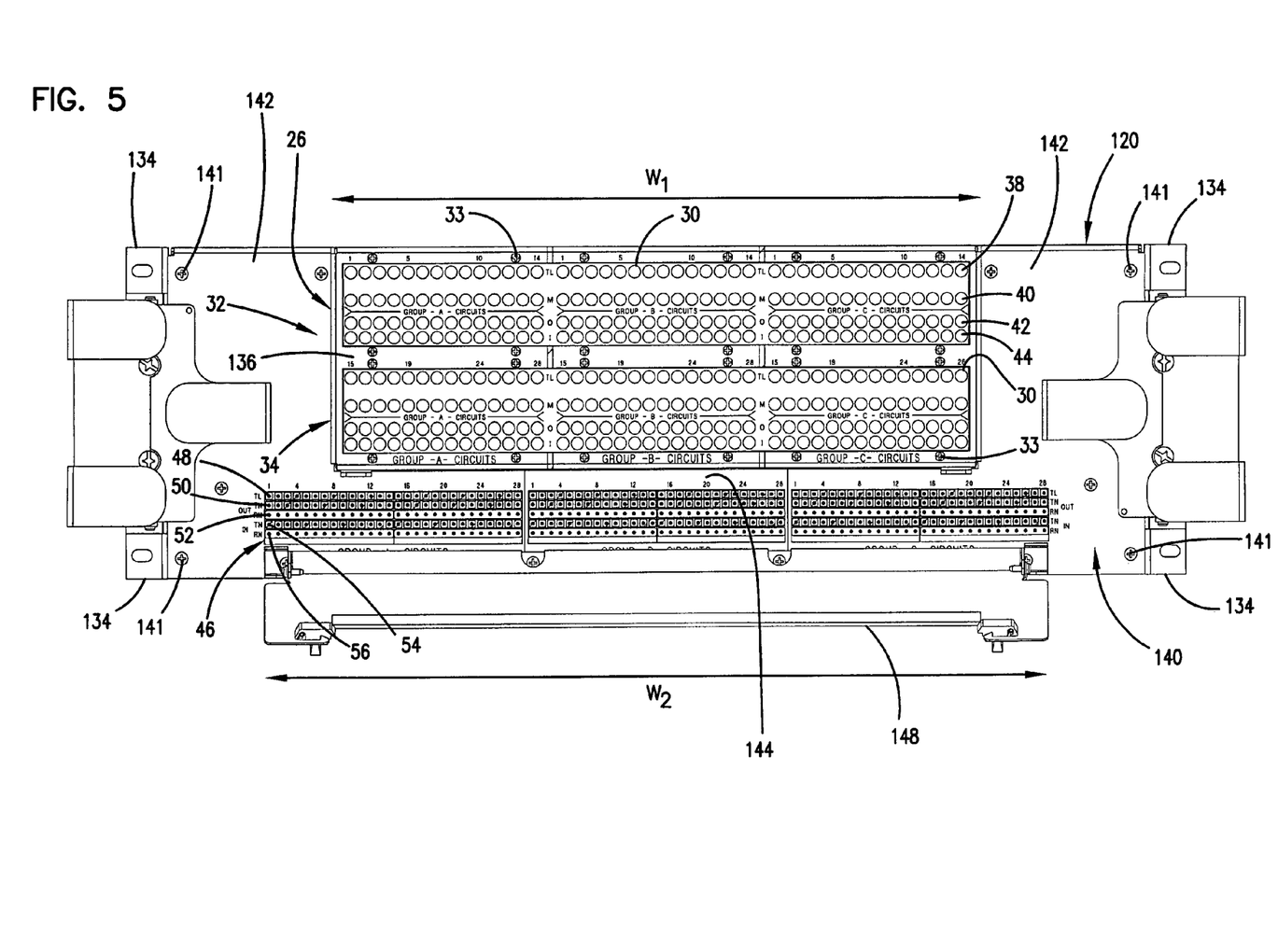
FIG. 5 is a front elevational view of the jack module of FIG. 4.

As shown in FIGS. 1 and 2, the front jack fields 26 of the jack modules 24 face outward from the front sides 28 of the frames 21. Each jack field 26 includes an array of separate circuits or jacks 30 (e.g., eighty-four jacks 30 are shown in each of the jack fields 26). Referring to FIG. 5, the illustrated jack field 26 is arranged in an array of jacks 30 having a top, horizontal row 32 positioned above a bottom, horizontal row 34. The array is generally rectangular and has a horizontal width $W_1$. In the preferred embodiment, each of the jacks 30 includes a LED port 38, a MONITOR port 40, an OUT port 42, and an IN port 44. More or fewer ports than those could be used. For example, and extra MONITOR port (e.g., for monitoring an "IN" signal) could be used.

Referring to FIG. 4, the jacks 30 of the illustrated jack field 26 are fastened (e.g., by fasteners 33) to a front jack panel 136. The jack panel 136 is connected to the chassis 120. For example, the jacks 30 are secured generally between the central extensions 128 of the chassis 120, and fasteners 35 are used to connect the jack panel 136 to the secondary side walls 132 of the chassis 120. As so mounted, the jacks 30 are arranged and configured to form a generally planar front face of the jack module 24. By disconnecting the fasteners 35 from the secondary side walls 132, the entire jack field 26 can be independently removed from the jack module 24.

IV. Cross-Connect Field

Referring to FIGS. 1, 2, 4 and 5, similar to the jack fields 26, the cross-connect fields 46 of the jack modules 24 face outward from the front sides 28 of the frames 21. Each of the cross-connect fields 46 is positioned directly beneath a corresponding one the jack fields 26 and has a horizontal width $W_2$ that is greater than the horizontal width $W_1$ of the jack fields 26. The cross-connect fields 46 each include a plurality of sets (e.g., 84 sets are shown) of cross-connect locations (e.g., wire termination members, pins, electrical connectors or the like). For example, as shown in FIG. 5, each set of cross-connect locations include a tracer lamp contact 48, a cross-connect tip-out contact 50, a cross-connect ring-out contact 52, a cross-connect tip-in contact 54 and a cross-connect ring-in contact 56. As will be described later in the specification, each set of cross-connect contacts is electrically connected to a corresponding jack 30 within the same jack module.

Referring to FIGS. 4 and 5 (in which the frame 21 has been omitted for clarity), the cross-connect field 46 of the illustrated module 24 is secured to the chassis 120 by a cross-connect panel 140. The cross-connect panel 140 is recessed relative to the front face of the jack field 26 and is fastened to the chassis 120 by fasteners 141. Side portions 142 of the cross-connect panel 140 are located adjacent the notched regions 130 of the chassis 120 on opposite sides of the jack field 26. A lower portion 144 of the cross-connect panel 140 extends beneath the jack field 26 and interconnects the two side portions 142. The cross-connect field 46 is secured to the lower portion 144 of the cross-connect panel 140. By disconnecting the fasteners 141, the entire cross-connect panel 140, including the cross-connect field 46, can be independently removed from the chassis 120.

To facilitate horizontal cable management, the lower portion 144 of the cross-connect panel 140 includes a generally horizontal jumper tray 146 located beneath the cross-connect field 46. The jumper tray 146 projects in a forward direction from the chassis 120 and is adapted for supporting cross-connect cables connected to the cross-connect field 46. Because the cross-connect panel 140 is recessed inward relative to the front of the chassis 120, the jumper tray 146 can project outward without violating the bay footprint. A jumper tray door 148 is pivotally connected to a free end of the jumper tray 146. The jumper tray door 148 is pivotally movable about a generally horizontal pivot axis.

V. Input/Output Field

Figure 6:
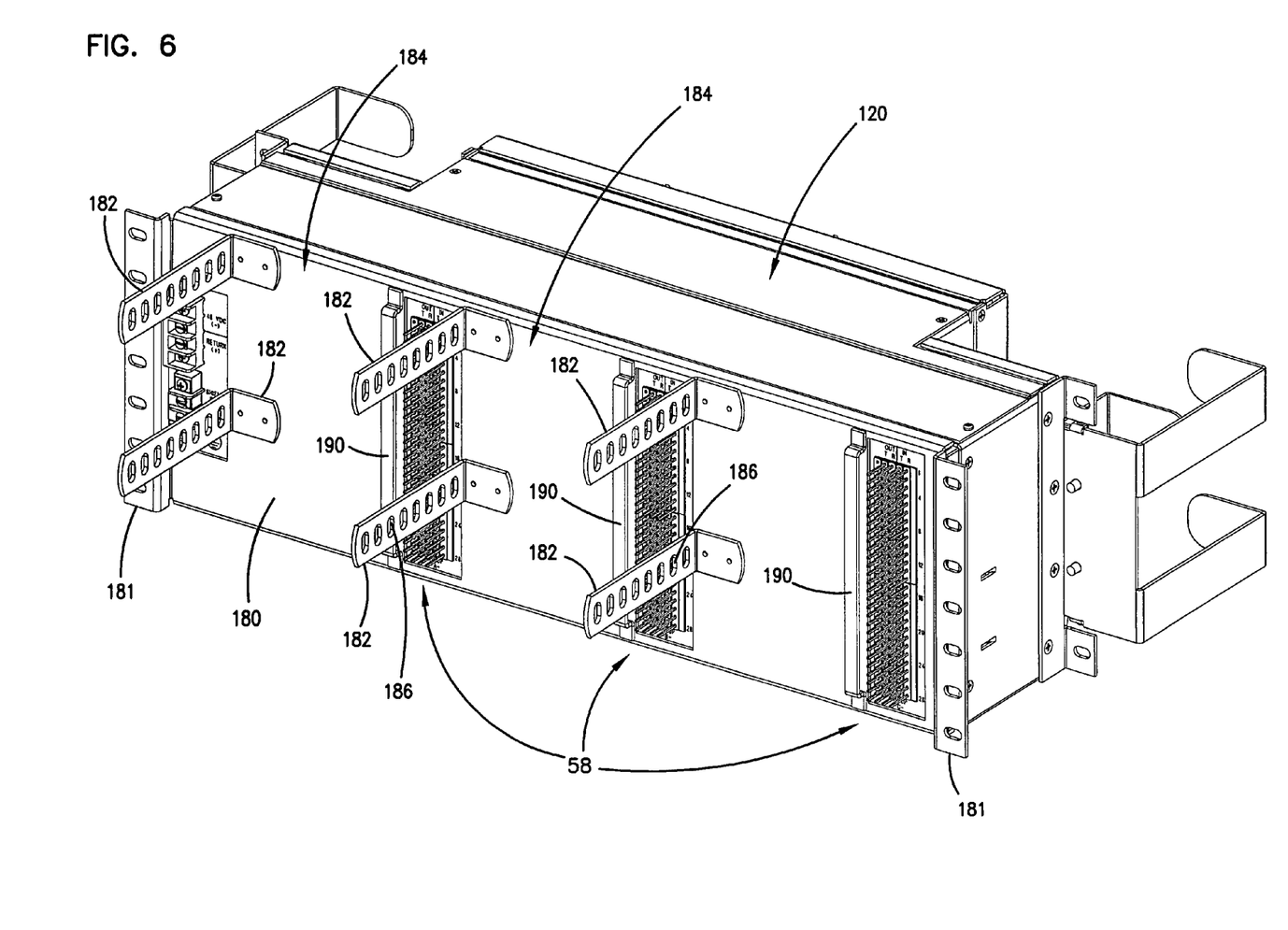
FIG. 6 is a rear perspective view of the jack module of FIG. 4.
Figure 7:
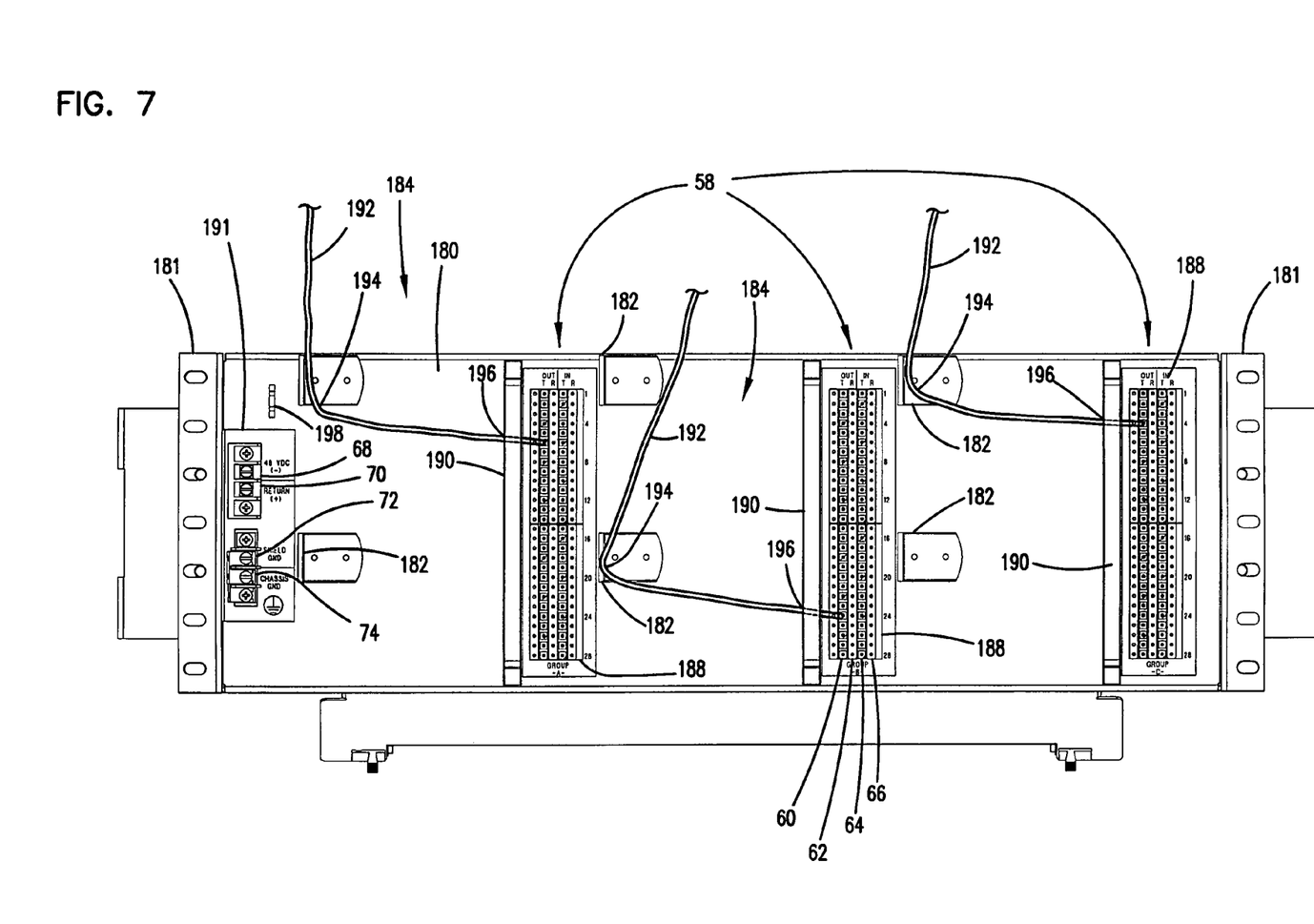
FIG. 7 is a rear elevational view of the jack module of FIG. 4.

Referring to FIGS. 6 and 7, a representative one of the input/output fields 58 is shown. The illustrated input/output field 58 faces outward from a back side of the chassis 120 and includes three separate arrays of input/output connection locations. Each array includes a plurality of sets (e.g., 28 sets) of input/output locations. As shown in FIG. 6, each set includes a tip-out contact 60, a ring-out contact 62 a tip-in contact 64, and a ring-in contact 66. The input/output contact locations preferably comprise wire termination members, pins, electrical connectors, or the like. Each set of input/output connection locations is preferably electrically connected to a corresponding jack mounted within the same module 24.

Referring again to FIG. 7, the jack module 24 also includes a voltage contact 68, a voltage return contact 70, and shield ground contact 72, and a chassis ground contact 74. Similar to the input/output field 58, the contacts 68, 70, 72 and 74 face outward from the back side of the chassis 120.

VI. Jack Circuitry

Figure 8:
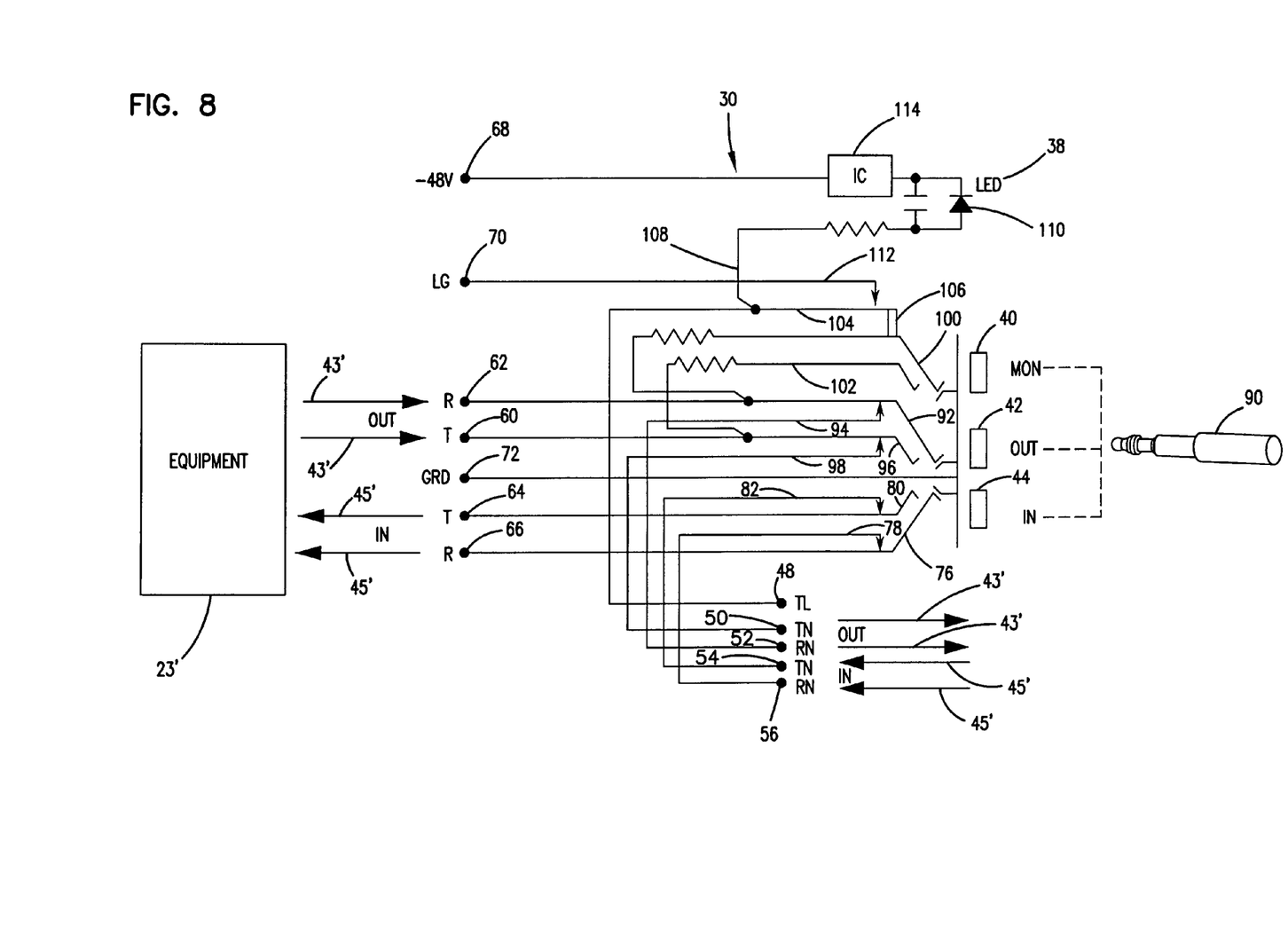
FIG. 8 is an illustrative circuit diagram for one of the jacks of the jack module of FIG. 4.

FIG. 8 is a circuit diagram illustrating the electrical connections made for one of the jacks 30. The illustrated jack 30 is shown receiving a twisted pair signal 43' from a first piece of telecommunications equipment 23'. The jack 30 is also shown outputting a cross-connected twisted pair signal 45' (e.g., a signal cross-connected from a second piece of equipment) to the first piece of equipment 23'. It will be appreciated that similar electrical configurations are used for each of the jacks 30 in each module 24.

Referring to FIG. 8, the IN port 44 includes a ring spring 76, and a normal spring 78 that normally engages the ring spring 76. The IN port also includes a tip spring 80 and a normal spring 82 that normally engages the tip spring 80. The ring spring 76 is electrically connected to ring-in contact 66. The normal contact 78 is electrically connected to cross-connect ring-in contact 56. The tip spring 80 is electrically connected to tip-in contact 64. Finally, the normal contact 82 is electrically connected to cross-connect tip-in contact 54.

The signal 45' enters the jack 30 through the cross-connect contacts 54 and 56. With no plug inserted within the IN port 44, the signal 45' passes from the normal springs 82 and 78 though the tip-and-ring springs 80 and 76 and is outputted through contacts 64 and 66 to the first piece of equipment 23'. By inserting a plug 90 within the IN port 44, the signal 45' can be interrupted and a signal from the inserted plug 90 can be outputted at contact points 64 and 66. With respect to the jack 30, the signal 45' is commonly referred to as an "IN" signal because it is inputted to the first piece of equipment 23'.

Referring again to FIG. 8, the OUT port 42 includes a ring spring 92 and a normal spring 94 that normally contacts the ring spring 92. The OUT port 42 also includes a tip spring 96, and normal spring 98 that normally contacts tip spring 96. The ring spring 92 is electrically connected to ring-out contact 62, and the normal contact 94 is electrically connected to cross-connect ring-out contact 52. The tip spring 96 is electrically connected to tip-out contact 60, and the normal spring 98 is electrically connected to cross-connect tip-out contact 50. A signal 43' is transmitted from the first piece of equipment 23' to the jack 30 through contacts 60 and 62. With no plug in the OUT port 42, the signal 43' travels from the tip-in ring springs 96 and 92 through the normal springs 98 and 94 and exits the jack 30 via cross-connect contacts 50 and 52. Frequently, the cross-connect contacts 50 and 52 are electrically connected to another set of cross-connect contacts to provide a cross-connection. By inserting a plug within the OUT port 42, the signal 43' from contacts 60 and 62 is interrupted and may be outputted to the tip-and-ring contacts of the plug inserted within the OUT port 42. With respect to the jack 30, the signal 43' is commonly referred to as an "OUT" signal because it is outputted from the first piece of equipment 23'.

Still referring to FIG. 8, the MONITOR port 40 includes a ring spring 100 electrically connected to the ring spring 92 of the OUT port 42, and a tip spring 102 electrically connected to the tip spring 96 of the OUT port 42. Frequently it is desirable to monitor the signal 43' arriving through contacts 62 and 60 without interrupting the signal 43'. To accomplish this, a plug is inserted into the monitor port 40. On this occurrence, the plug taps into the signal 43' being transmitted through the tip-and-ring springs 96 and 92 of the OUT port 42 without interrupting the signal 43'. Resistors prevent the signal 43' from short circuiting through the tip and ring springs 102 and 100.

The MONITOR port 40 also includes a spring 104 that is mechanically connected to the ring spring 100 by a dielectric spacer 106. The spring 104 is electrically connected to tracer lamp contact 48. Additionally, a lead 108 electrically connects the spring 104 to an LED 110 preferably mounted at the LED port 38. The LED 110 is also electrically connected to voltage contact 68. A return spring 112 is positioned above the spring 104. The return spring 112 is electrically connected to voltage return contact 70. When a plug is inserted within the monitor port 40, the spring 104 is biased into contact with the return spring 112. This electrical connection connects the LED 110 to the return line 112 thereby illuminating the LED. An integrated circuit chip 114 controls the flashing of the LED 110 as is conventionally known in the art. In addition to activating the LED, insertion of a plug into the monitor port 40 also grounds the tracer lamp contact 48 causing illumination of an LED on a jack to which the present jack is cross-connected.

VII. Front Cable Management

As shown in FIGS. 1 and 2, each rack 20 includes two sets of cable management brackets 150 that define vertical channels 152 arranged for receiving and vertically managing a plurality of cross-connect cables. For example, the channels 152 are configured to manage vertical cross-connect cables, such as cable 154, that extend between different jacks in the same rack 20. Also, the vertical channels 154 vertically manage cross-connect cables, such as cable 156, that extend from one of the jacks 30 to either a top or bottom trough 158. The troughs 158 provide horizontal support for cross-connect cables interconnected between two different racks 20. As shown in FIG. 2, outer edges or lips 159 of the troughs 158 are aligned generally along vertical planes P that extend along innermost portions of the brackets 150. The alignment of the lips 159 along the planes P assists in providing smooth cable transitions between the troughs 158 and the channels 152.

The vertical channels 152 are located on opposite sides of each frame 21 with the jack modules 24 located between the channels 152. The cable management brackets 150 include outer bracket portions 160 fixedly connected to the fronts 28 of the frames 21 by fasteners 162. The cable management brackets 150 also include inner bracket portions 164 pivotally connected to the outer bracket portions 160. The inner bracket portions 164 of the brackets 150 are pivotally movable about substantially vertical pivot axes between a first orientation (shown in FIGS. 1, 2 and 9A) and a second orientation (shown in FIG. 9B). When in the first orientation, the inner bracket portions 164 extend partially across (e.g., partially block or obstruct) front regions of the bay openings 22. When in the second orientation, the inner bracket portions 164 are generally offset from the front regions of the bay openings 22.

The pivotal nature of the brackets 150 assists in installing or removing the jack modules 24 from the frames 21. For example, to install one of the jack modules 24 in one of the frames 21, the jack module 24 is inserted through the front 28 of the frame 21 into the bay opening 22. Once the module 24 is positioned within the bay 22, the chassis 120 of the jack module 24 is fastened to the frame 21. If the brackets 150 were not free to pivot, the inner bracket portions 164 that overlap the fronts of the bay openings 22 would prevent the modules 24 from being inserted in or removed from the frames 21. However, because the inner bracket portions 164 are free to pivot, the jack modules 24 can be inserted into or removed from the frames 21 without removing the brackets 150 from the frames 21. For example, by pivoting the inner bracket portions 164 from the first position of FIGS. 1, 2 and 9A to the second position of FIG. 9B, sufficient clearance is provided for allowing the jack module 24 to be inserted into or removed from each frame 21. Because the brackets 150 are connected to the frames 21, full vertical cable management is provided at the front of the rack 20 even if only a few modules 24 are mounted in a given frame 21.

Figures 9A, 9B:
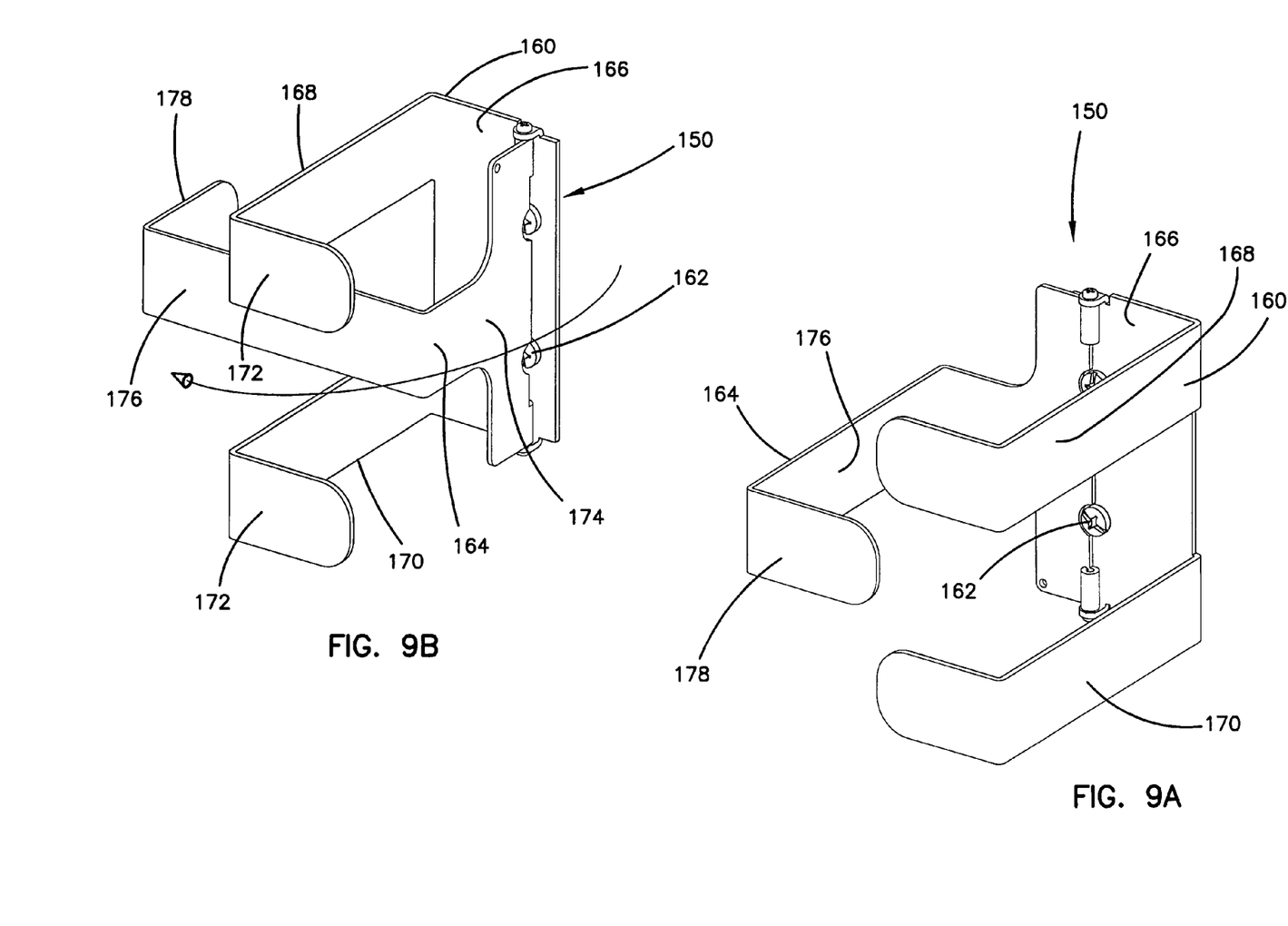
FIG. 9A is a perspective view of a front cable management bracket used by the rack of FIGS. 1 and 2, the bracket is shown in an open orientation.
FIG. 9B is a perspective view of the bracket of FIG. 8A in a closed orientation.

Referring to FIGS. 9A and 9B, the outer bracket portion 160 of each bracket 150 includes a main base 166 and spaced-apart, substantial parallel upper and lower bracket members 168 and 170 that extend transversely outwardly from the main base 166. The first bracket portion also includes retaining tabs 172 that project transversely outward from free ends of the upper and lower bracket members 168 and 170.

The inner bracket portion 164 of each mounting bracket 150 includes a pivot base 174 and an intermediate bracket member 176. The intermediate bracket member 176 of each pivot base 174 is vertically aligned generally between the upper and lower bracket members 168 and 170 of its corresponding outer bracket portion 160. Each inner bracket portion 164 also includes a transversely projecting retaining tab 178.

The pivot bases 174 are pivotally connected to the main bases 176 such that the inner and outer bracket portions 164 and 160 are pivotally movable relative to one another. Each bracket 150 defines a generally rectangular opening sized for receiving a plurality of cross-connected cables when in the first or open position of FIG. 9A. When the brackets 150 are in the second or closed position of FIG. 9B, the intermediate bracket members 176 fit between the upper and lower bracket members 168 and 170.

VIII. Rear Cable Management

The racks 20 are configured such that input/output cables (e.g., equipment cables), which commonly extend downward from a ceiling access location or upward from a floor access location, are adapted to extend along back sides 29 of the frames 21. Consequently, unlike some conventional designs, the input/output cables are not fed between the individual racks 20 and no fillers are required.

The racks 20 include rear cable management structures for vertically managing the cascade of input/output cables that will be provided that the back side 29 of each frame 21. For example, referring to FIGS. 6 and 7, the racks 20 include a plurality of rear cable management panels 180 (one of which is shown) adapted to be connected to the back side 29 of each frame 21. The illustrated cable management panel 180 includes transverse flanges 181 defining openings for allowing the rear cable management panel 180 to be fastened (e.g., by fasteners such as bolts, screws or the like) to the back side 29 of one of the frames 21. For clarity, the frame 21 has been omitted from FIGS. 6 and 7 to better shown the spatial relationship between the panel 180 and its corresponding chassis 120 when both are secured to the frame 21.

As shown in FIGS. 6 and 7, the illustrated rear cable management structure also includes three sets of tie-down members 182 that are laterally spaced across the rear cable management panel 180 so as to define a plurality of vertical channels 184. Each set of tie-down members 182 includes two vertically spaced-apart tie-down members 182 that project outward from the rear cable management panel 180. The tie-down members 182 define a plurality of openings 186 for allowing input and output cables to be tied down.

The rear cable management panel 180 of FIGS. 6 and 7 defines three separate access openings 188 sized for receiving the three separate arrays of input/output connection locations corresponding to the jack module 24. Cable bars 190 are positioned adjacent the access openings 188. The cable bars 190 define vertically elongated tie-down loops for tying down cables. The cable bars 190 are preferably positioned between the access openings 188 and their corresponding sets of tie down members 182.

Referring to FIG. 7, several input/output cables 192 are shown extending along the rear cable management panel 180. The cables 192 have first portions 194 tied down at the tie-down members 182, and second portions 196 tied down at the cable bars 190. In this manner, the cables 192 extend laterally from their corresponding tie-down members 182 to their corresponding input/output connection location.

Still referring to FIG. 7, the rear cable management panel 180 also defines an opening 191 for providing access to the voltage contact 68, the voltage return contact 70, the shield ground contact 72 and the chassis ground contact 74. The contacts 68-74 are separated from the input/output cables 192 by the tie-down members 182. A lance 198 is provided for tying down wires connected to the contacts 68-74.

Figure 10:
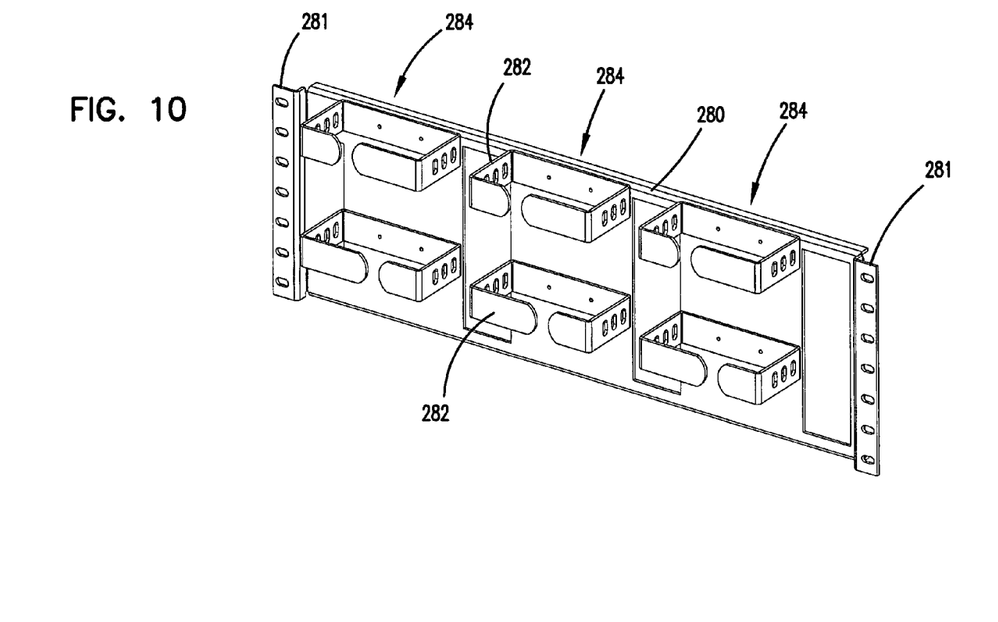
FIG. 10 is a perspective view of a rear cable management structure constructed in accordance with the principles of the present invention.
Figure 11:
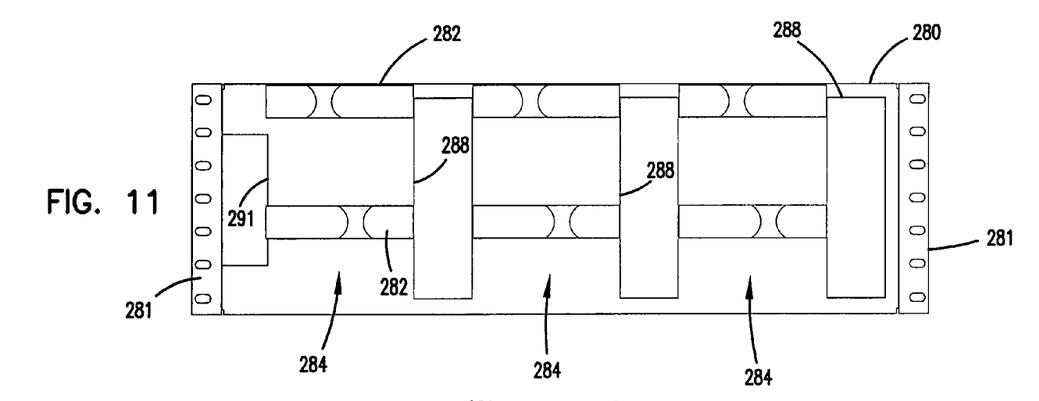
FIG. 11 is an elevational view of the rear cable management structure of FIG. 10.

FIGS. 10 and 11 illustrate an alternative rear cable management structure constructed in accordance with the principles of the present invention. The structure includes a rear cable management panel 280. The panel 280 includes transverse flanges 281 defining apertures for allowing the panel 280 to be connected to the back side 29 of one of the frames 21 by conventional fasteners. The cable management structure also includes three separate vertical channels 284 for vertically managing input/output cables. Each of the vertical channels 284 is defined by two vertically-spaced apart bracket members 282. The bracket members project outward from the cable management panel 280 and define generally rectangular openings sized for receiving the input/output cables. Generally rectangular access openings 288 are positioned adjacent to each of the vertical channels 284. The access openings 288 are sized and shaped to provide access to input/output contact locations corresponding to a particular jack module. The cable management panel 280 also defines an opening 291 for providing access to voltage contacts, voltage return contacts, shield ground contacts and chassis ground contacts corresponding to the particular jack module.

Figure 12:
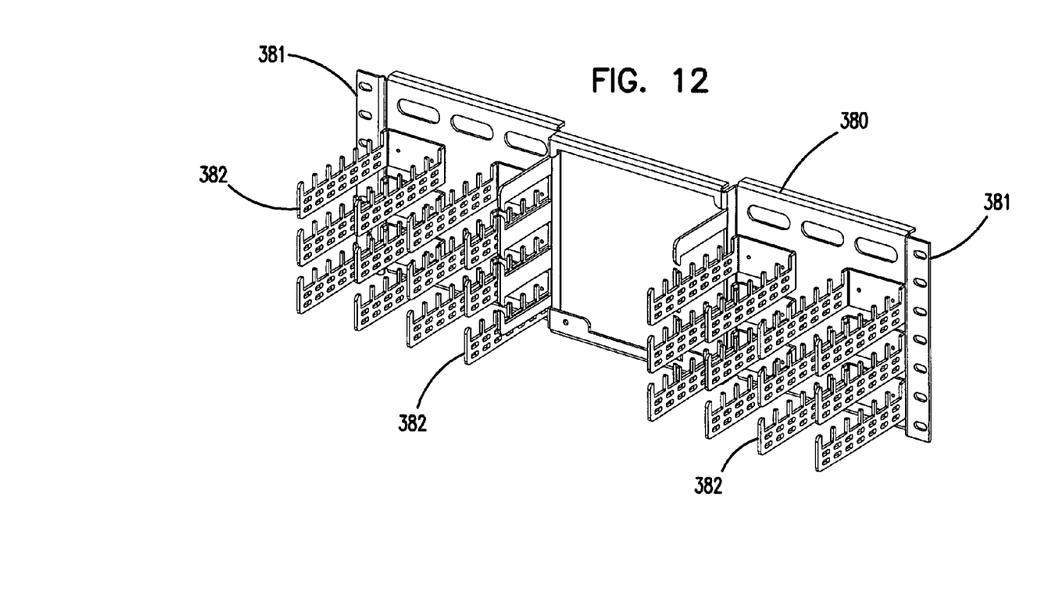
FIG. 12 is a perspective view of a further rear cable management structure constructed in accordance with the principles of the present invention.
Figure 13:
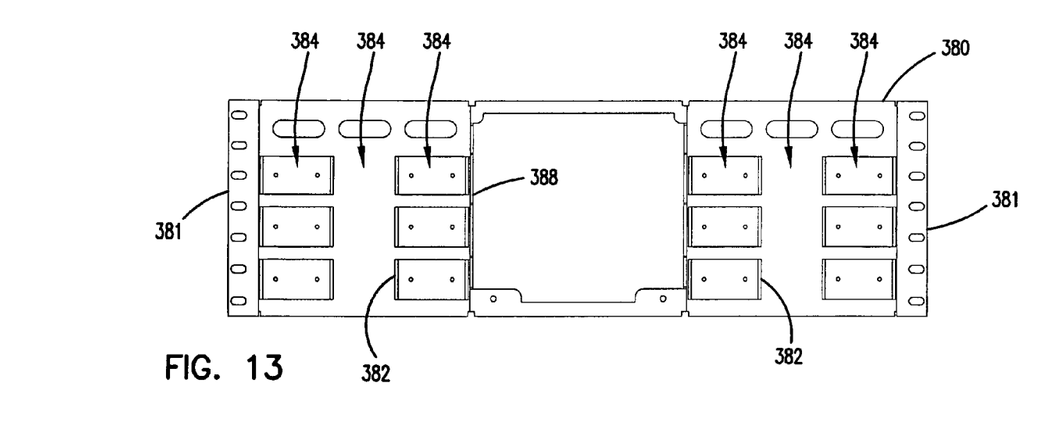
FIG. 13 is an elevational view of the rear cable management structure of FIG. 12.

FIGS. 12 and 13 show another rear cable management structure constructed in accordance with the principles of the present invention. The cable management structure includes a rear cable management panel 380. The rear cable management panel 380 includes transverse flanges 381 defining openings for allowing the panel 380 to be fastened (e.g., by conventional fasteners) to the back side 29 of one of the frames 21. The cable management panel 380 defines a single, central access opening 388 for providing input/output contact access. The rear cable management structure also includes six vertical cable management channels 384 defined between eight sets of tie-down members 382. Each set of tie-down members 382 includes three vertically spaced-apart tie-down members 382.

Having described preferred aspects and embodiments of the present invention, modifications and equivalents of the disclosed concepts may readily occur to one skilled in the art. However, it is intended that such modifications and equivalents be included within the scope of the claims that are appended hereto.

I claim:

1. A cable management bracket comprising:
   a first bracket portion including a base and upper and lower bracket members that extend outward from the base, the upper and lower bracket members defining a space therebetween, the first bracket portion further including retaining tabs that project at an angle from free ends of the upper and lower bracket members;
   a second bracket portion including a pivot base and an intermediate bracket member that extends outward from the pivot base and is vertically aligned generally between the upper and lower bracket members, the second bracket portion further including a retaining tab that projects at an angle from a free end of the intermediate bracket member;
   the pivot base of the second bracket portion being pivotally connected to the base of the first bracket portion such that the first bracket portion and the second bracket portion are pivotally moveable between a first position in which the first and second bracket portions define an opening sized to receive a plurality of cross-connect cables, and a second position in which the intermediate bracket member of the second bracket portion is located within the space defined between the upper and lower bracket members of the first bracket portion.

2. The cable management bracket of claim 1, further including fasteners for securing the cable management bracket to a frame of a telecommunications rack.

3. The cable management bracket of claim 1, wherein one of the first bracket portion and the second bracket portion defines mounting holes sized for receipt of fasteners.

4. The cable management bracket of claim 1, wherein the first and second bracket portions are pivotally moveable about a vertical axis.

5. The cable management bracket of claim 1, wherein the opening is a rectangular opening.

6. The cable management bracket of claim 1, wherein the tabs of the upper and lower bracket members and the tab of the intermediate bracket member extend in a transverse direction from the free ends of the members.

7. The cable management bracket of claim 4, wherein each of the upper bracket member, the lower bracket member, and the intermediate bracket member of the first and second bracket portions extends in the same horizontal direction when the first and second bracket portions are in the first position.

8. The cable management bracket of claim 7, wherein the upper bracket member and the lower bracket member extend in a first horizontal direction, and wherein the intermediate bracket member extends in a second horizontal direction different than the first horizontal direction, when the first and second bracket portions are in the second position.

9. The cable management bracket of claim 8, wherein the second different horizontal direction is a transverse direction to that of the first horizontal direction.

* * * * *